US012584597B1

(12) United States Patent
Gibson et al.

(10) Patent No.: US 12,584,597 B1
(45) Date of Patent: Mar. 24, 2026

(54) LIGHT PIPE BULB ASSEMBLY AND LIGHTING ASSEMBLIES EMPLOYING SAME

(71) Applicant: Everi Games, Inc., Austin, TX (US)

(72) Inventors: Daniel Gibson, Austin, TX (US); Peter A. Phillips, Jr., Austin, TX (US)

(73) Assignee: Everi Games Inc., Austin, TX (US)

( * ) Notice: Subject to any disclaimer, the term of this patent is extended or adjusted under 35 U.S.C. 154(b) by 0 days.

(21) Appl. No.: 19/071,307

(22) Filed: Mar. 5, 2025

(51) Int. Cl.
| | |
|---|---|
| *F21K 9/61* | (2016.01) |
| *F21V 8/00* | (2006.01) |
| *F21V 33/00* | (2006.01) |
| *G07F 17/32* | (2006.01) |

(52) U.S. Cl.
CPC .............. *F21K 9/61* (2016.08); *F21V 33/008* (2013.01); *G02B 6/0008* (2013.01); *G07F 17/3216* (2013.01)

(58) Field of Classification Search
CPC . F21K 9/232; F21K 9/61; F21V 17/04; F21V 17/06; F21Y 2103/30; F21Y 2103/33; F21Y 2103/37; G02B 6/0008; G07F 17/3216
See application file for complete search history.

(56) References Cited

U.S. PATENT DOCUMENTS

| | | | |
|---|---|---|---|
| 8,777,757 B2 | 7/2014 | Chudek | |
| 10,096,202 B2 | 10/2018 | Castro et al. | |

| | | | |
|---|---|---|---|
| 11,069,179 B2 | 7/2021 | Glenn et al. | |
| 2007/0287528 A1* | 12/2007 | Hirato | G07F 17/3216 463/20 |
| 2010/0148650 A1* | 6/2010 | Wu | F21K 9/232 313/1 |
| 2013/0077317 A1* | 3/2013 | Peng | G02B 6/0008 362/294 |
| 2013/0265796 A1* | 10/2013 | Kwisthout | F21K 9/238 362/558 |
| 2013/0279149 A1* | 10/2013 | Udatsu | F21K 9/64 362/84 |
| 2015/0371486 A1 | 12/2015 | Castro et al. | |
| 2016/0258579 A1* | 9/2016 | Dulley | G02B 6/0008 |
| 2022/0308282 A1* | 9/2022 | Onitsuka | F21V 7/0025 |

* cited by examiner

*Primary Examiner* — Alexander K Garlen
(74) *Attorney, Agent, or Firm* — Calvert Technology Law, PLLC; Nathan H. Calvert

(57) ABSTRACT

A light pipe bulb assembly and a lighting assembly for use in gaming machines, signage, and the like, are provided. The light pipe bulb assembly receives light from an LED on a PCB at a back side of a housing face element, emits the light at a front side of a housing face element, and includes a bulb housing adapted to be mounted through a hole in the housing face element, and defines an interior volume. A transparent dome is attached to a front portion of the bulb housing. A light pipe holder is positioned between the PCB and the housing face element, and a light pipe is held by the light pipe holder with a proximal end positioned to receive light from the LED. The light pipe extends forward within the interior volume of the bulb housing to present a distal end toward the transparent dome for emitting light.

16 Claims, 5 Drawing Sheets

LIGHT PIPE BULB ASSEMBLY AND LIGHTING ASSEMBLIES EMPLOYING SAME

TECHNICAL FIELD OF THE INVENTION

The invention relates to lighting fixtures, and in particular those that use light pipes, for example for lighting displays used in gaming machines.

BACKGROUND

Gaming machines, such as slot machines deployed in a casino floor, often use LED (light emitting diode) strips or panels to provide accent lighting effects. In the gaming industry, attractive lighting is important to attracting players to the gaming machines. In this regard, lighting displays are often used to attract attention to a gaming machine, and to enhance award presentation.

To create lighting displays with a "retro" style, incandescent light bulbs may be used in lighting displays. However, such bulbs are costly, use excessive amounts of power, produce excessive amounts of heat, and require frequent replacement. While more modern LED-based light bulbs may be used, such bulbs often do not have the classic look and feel of incandescent bulbs, and require wiring of sockets and extra assembly steps to produce a display.

The inventors have thus identified that a need exists to improve the design and construction of lighting displays that employ traditional light bulb shapes in the display.

SUMMARY

It is an object of the invention to provide lighting assemblies and light pipe bulb assemblies that resemble incandescent bulbs but provide a cheaper and easier to manufacture and assemble that similar lighting assemblies using integrated LED bulbs. It is a further object of the invention to provide a light pipe bulb assembly that may be used in a variety of lighting fixtures and integrated into structures such as gaming machines.

According to a first aspect of the invention, a lighting assembly includes an assembly housing with a housing face element defining a plurality of holes. A PCBA is positioned behind the housing face element and includes a first plurality of LED packages mounted to it. The lighting assembly further includes a first plurality of light pipe bulb assemblies, each with a bulb housing that extends through a respective one of the holes of the housing face element and defines an interior volume. A transparent dome is attached to a front portion of the bulb housing. A light pipe holder is positioned between the PCBA and the housing face element, and a light pipe is held by the light pipe holder with a proximal end positioned in front of a respective one of the LED packages to receive light from the LED package. The light pipe extends forward within the interior volume of the bulb housing through the respective hole of the housing face element to present a distal end toward the transparent dome for emitting light through the transparent dome.

In some implementations of the first aspect, the distal end of the light pipe is textured to diffuse the emitted light. In further implementations, the light pipe is constructed with injection-molded acrylic, and the distal end of the light pipe is textured with an MT-11010 texture.

In some implementations, the light pipe holder includes an outer portion abutting the housing face element and an inner portion defining an opening with an inner retention ridge extending into the opening and abutting an outer retention ridge of the light pipe.

In some implementations, the bulb housing further includes a proximal inner retention ridge abutting a back surface of the housing face element and a distal inner retention ridge abutting a front surface of the housing face element. The proximal inner retention ridge may be a snap-fit ridge. Further, the bulb housing may include a tubular portion extending through the respective hole and forming the proximal inner retention ridge and the distal inner retention ridge, an outer half-globe portion for connecting the transparent dome, and a fillet portion of increasing diameter connecting the tubular portion and the outer half-globe portion.

In some implementations, the lighting assembly is a gaming machine lighting assembly. The plurality of holes of the housing face element are arranged in a curve along a front side of the gaming machine lighting assembly. A second plurality of holes are also defined by the housing face element and arranged in a second curve along a front side of the gaming machine lighting assembly. The gaming machine lighting assembly also includes a second PCBA positioned behind the housing face element and includes a second plurality of LED packages mounted to it. The gaming machine lighting assembly may further include a second plurality of light pipe bulb assemblies constructed like the first and arranged in a second curve along a second plurality of holes of the housing face element. The gaming machine lighting assembly may include a second housing face element positioned above and backward from the first housing face element and defining a third plurality of holes and a fourth plurality of holes arranged in curves. This gaming machine lighting assembly also includes third and fourth PCBAs positioned behind the housing face element and includes third and fourth pluralities of LED packages mounted to them. This gaming machine lighting assembly further includes a third plurality of light pipe bulb assemblies and a fourth plurality of light pipe bulb assemblies constructed as in the first aspect and arranged in third and fourth curves along the third and fourth plurality of holes of the second housing face element.

According to a second aspect of the invention, a light pipe bulb assembly is provided for receiving light from an LED on a PCBA at a back side of a housing face element and emitting the light at a front side of a housing face element. The light pipe bulb assembly includes a bulb housing adapted to be mounted through a hole in the housing face element and defines an interior volume. A transparent dome is attached to a front portion of the bulb housing. A light pipe holder is positioned between the PCBA and the housing face element, and a light pipe is held by the light pipe holder with a proximal end positioned to receive light from the LED. The light pipe extends forward within the interior volume of the bulb housing to present a distal end toward the transparent dome for emitting light.

In some implementations of the second aspect, the distal end of the light pipe is textured to diffuse the emitted light. In further implementations, the light pipe is constructed with injection-molded acrylic, and the distal end of the light pipe is textured with an MT-11010 texture.

In other implementations, the light pipe holder includes an outer portion abutting the housing face element and an inner portion defining an opening with an inner retention ridge extending into the opening and abutting an outer retention ridge of the light pipe.

In additional implementations, the bulb housing further includes a proximal inner retention ridge abutting a back surface of the housing face element and a distal inner retention ridge abutting a front surface of the housing face element. The proximal inner retention ridge may be a snap-fit ridge. Further, the bulb housing may include a tubular portion extending through the respective hole and forming the proximal and distal inner retention ridges, an outer half-globe portion for connecting the transparent dome, and a fillet portion of increasing diameter connecting the tubular portion and the outer half-globe portion.

According to a third aspect of the invention, a gaming machine includes a gaming machine cabinet. The gaming machine features a button panel located along a ledge at the front side of the cabinet and a display panel mounted above the button panel on the front side of the cabinet. A top box lighting assembly forms the top of the gaming machine cabinet, which includes a second display panel positioned above the first display panel. The assembly housing features a housing face element with multiple holes, a PCBA positioned behind the housing face element, and a first plurality of LED packages mounted on the PCBA. A first plurality of light pipe bulb assemblies are part of the top box lighting assembly, each including a bulb housing that extends through a respective hole in the housing face element, defining an interior volume. A transparent dome is attached to the front portion of the bulb housing, and a light pipe holder is positioned between the PCBA and the housing face element. The light pipe is held by the light pipe holder with a proximal end positioned in front of a respective LED package to receive light, extending forward within the interior volume of the bulb housing through the respective hole to present a distal end toward the transparent dome for emitting light.

In some implementations of the third aspect, the distal end of the light pipe is textured to diffuse the emitted light. The light pipe may be constructed with injection-molded acrylic featuring an MT-11010 texture. The light pipe holder may include an outer portion abutting the housing face element and an inner portion defining an opening with an inner retention ridge that abuts an outer retention ridge of the light pipe.

The bulb housing may further include a proximal inner retention ridge abutting a back surface of the housing face element and a distal inner retention ridge abutting a front surface of the housing face element. In certain configurations, the proximal inner retention ridge is a snap-fit ridge. The bulb housing may also include a tubular portion extending through the respective hole, forming the proximal and distal inner retention ridges, an outer half-globe portion for connecting the transparent dome, and a fillet portion of increasing diameter connecting the tubular portion and the outer half-globe portion.

The housing face element's plurality of holes may be arranged in a curve along the front side of the top box lighting assembly, with a second plurality of holes arranged in a second curve. The top box lighting assembly may also include a second PCBA positioned behind the housing face element with a second plurality of LED packages mounted to it and a second plurality of light pipe bulb assemblies constructed like the first and arranged in a second curve along the second plurality of holes.

In further implementations, the top box lighting assembly includes a second housing face element positioned above and backward from the first housing face element, defining a third and fourth plurality of holes arranged in curves. The assembly also includes third and fourth PCBAs positioned behind the housing face element with third and fourth pluralities of LED packages mounted to them and third and fourth pluralities of light pipe bulb assemblies constructed as in the primary embodiment arranged in third and fourth curves along the third and fourth plurality of holes of the second housing face element.

In other aspects of the invention, a lighting assembly using the light pipe bulb assemblies described herein may be provided for a display, a sign, an architectural feature, or other structure that includes multiple light bulbs.

These and other features and advantages of the invention will be apparent from the following description of representative embodiments considered along with the accompanying drawings.

In the following disclosure and claims, relative positional terms such as front, rear, top, bottom, side, right-side, left-side, above, below, and laterally, for example, are defined with reference to the orientation of the lighting assembly or gaming machine unless specifically stated otherwise.

DESCRIPTION OF REPRESENTATIVE EMBODIMENTS

Figure 1:
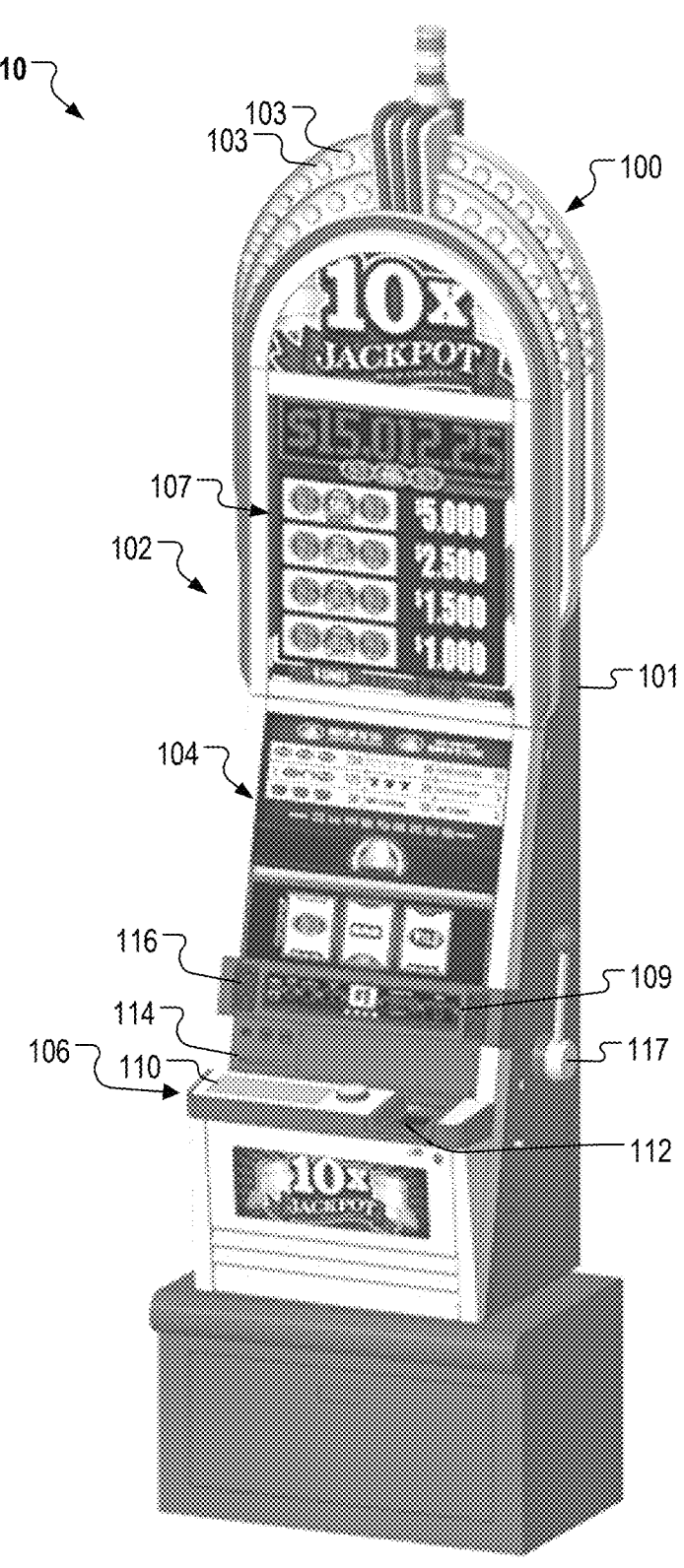
FIG. 1 is a perspective view of a gaming machine installation including a representative display panel installed in a cabinet.
Figure 2:
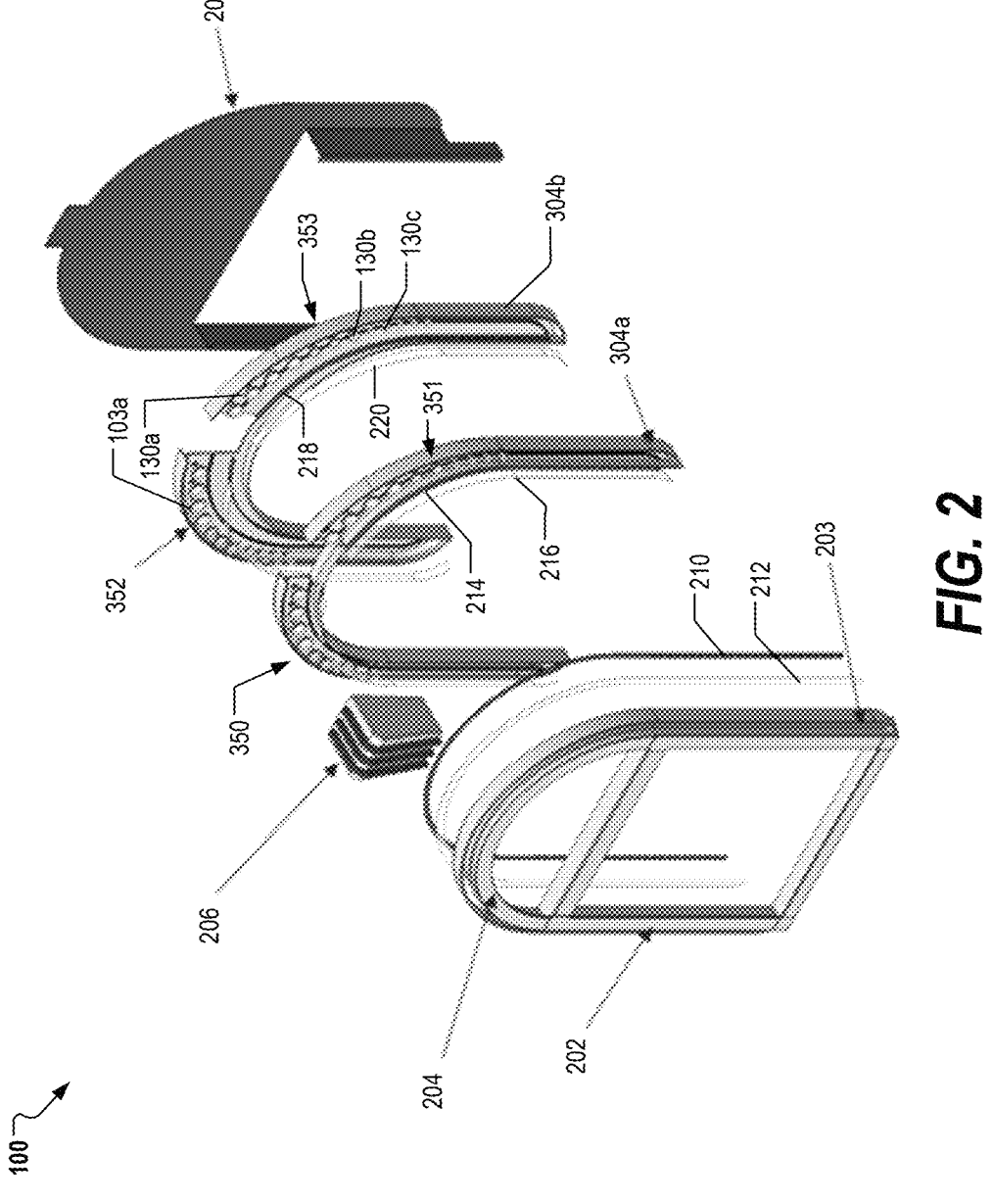
FIG. 2 shows a perspective exploded view of lighting assembly 100 of FIG. 1.

FIG. 1 shows a gaming machine 10 including a button deck with mechanical buttons according to some embodiments of the present invention. The block diagram of FIG. 2 shows further details of gaming machine 10 along with certain variations which may be included in the gaming machine. Referring to FIG. 1, gaming machine 10 includes a cabinet 101 having a front side generally shown at reference numeral 102. A primary video display device 104 is mounted in a central portion of the front side 102, with a button panel 106 positioned below the primary video display device and projecting forwardly from a plane defined by the primary video display device. In addition to primary video display device 104, the illustrated gaming machine 10 includes a secondary video display device 107 positioned above the primary video display device. A retro style rotating pull handle 117 is included, which functions similarly to a play button to activate plays.

Gaming machine 10 also includes an additional smaller auxiliary display, lower auxiliary display device 109, which is a touchscreen display in this embodiment. It should also be noted that each display device referenced herein may include any suitable display device including a cathode ray tube, liquid crystal display, plasma display, LED display, or any other type of display device currently known or that may be developed in the future.

One or more of these video display devices, and especially primary video display device 104, may be used to display game symbols which show the results for a given play of the game implemented through gaming machine 10. Such results may be shown by the manner in which game symbols are aligned along various paylines defined through a symbol location matrix presented by the display device 104. As will be described further below in connection with FIG. 2 and elsewhere, it is also possible for gaming machines within the scope of the present invention to include mechanical elements such as mechanical reels. One or more of the video display devices may also be used to show results in the form of a hand of playing cards, a dice roll, a horse race, or in any other fashion in which a result may be displayed. Generally, the display device or display devices of the gaming machine, whether video display devices, mechanical devices, or combinations of the two, which are used to display games according to embodiments of the invention, may be described in this disclosure and the accompanying claims as a display system.

Gaming machine 10 includes a lighting assembly 100 with multiple light pipe bulb assemblies 103. In this embodiment, lighting assembly 100 form a retro marquee shape with two tiers as shown, and light pipe bulb assemblies arranged in four curves, two on each tier with a "mohawk" style striped vertical light fixture separating the curves. The construction of lighting assembly 100 is further described below with respect to FIG. 2 through FIG. 4.

The gaming machine 10 illustrated for purposes of example in FIG. 1 also includes a number of mechanical control buttons 110 mounted on button panel 106. These control buttons 110 may allow a player to select a bet level, select paylines, select a type of game or game feature, and make a play input to start a play in a game. The player interface devices which receive player inputs to initiate the play of a game through the gaming machine, such as controls to select a wager amount for a given play and controls to enter a play input to actually start a given play in the wagering game, may be referred to generally as a player input system.

It will be appreciated that gaming machines may also include a number of other player interface devices in addition to devices that are considered player controls for use in playing a particular game. Gaming machine 10 also includes a currency/voucher acceptor having an input ramp 112, a player card reader having a player card input 114, and a voucher/receipt printer having a voucher/receipt output 115. Numerous other types of player interface devices may be included in gaming machines that may be used to implement embodiments of the present invention.

A gaming machine which may be used to implement embodiments of the present invention may also include a sound system to provide an audio output to enhance the user's playing experience. For example, illustrated gaming machine 10 includes speakers 116 which may be driven by a suitable audio amplifier (not shown) to provide a desired audio output at the gaming machine.

FIG. 2 shows a perspective exploded view of lighting assembly 100 of FIG. 1. The depicted embodiment illustrates one example implementation of a lighting assembly which is adapted to be attached atop a gaming machine as a "top box" accessory, to adapt the gaming machine to add the marquee style arched lighting assembly shown in an assembled state with the gaming machine 10 of FIG. 1. In other embodiments, the light pipe bulb assembly and the construction techniques herein are used in other types of lighting assemblies, such gaming machine overhead displays, gaming machine group displays, and signage displays for both interior and exterior signs and advertisements, for example.

Referring to lighting assembly 100, a bezel 202 surrounds the secondary display 107 (FIG. 1), and supports an arched tombstone frame element 204. Surrounding bezel 202 and tombstone frame element 204 is marquee front trim 203, including a translucent front LED trim piece 212, behind which is positioned front LED strip 210. Marquee front trim 203 arches over tombstone frame element 204 and provides a lighting effect from LED strip 210.

A middle housing face element 304*a* is positioned behind tombstone frame element 204, and includes a first curved region 350, a second curved region 351, and a slot formed between these two regions. A rear housing face element 304*b* is positioned behind middle housing face element 304*a* and includes a first curved region 352, a second curved region 353, and a slot formed between these two regions. A mohawk light assembly 206 includes three lighting strips transitioning from its top face to its front face as shown, and is positioned to fit into the slots provided by the middle housing face element 304*a* and the rear housing face element 304*b*.

As depicted, middle housing face element 304*a* and rear housing face element 304*b* hold a number of light pipe bulb assemblies 103, further described below. These light pipe bulb assemblies 103 are positioned in groups arranged along the respective curves 350, 351, 352, and 353 of the housing face elements. While the lighting assembly in this embodiment includes two separate housing face elements, other embodiments may include any suitable number of housing face elements in various shapes, as suitable for the application. By "housing face element", it is meant an element that provides an exterior face from which the bulbs appear to project. These housing face elements may be part of a larger housing piece that includes multiple housing face elements. The faces may point in different directions. A PCBA or substrate (not shown in FIG. 2) holding LEDs to provide light for light pipe bulb assemblies 103 of middle housing face element is mounted along the front side of rear housing face element 304*b*, while the PCBA or substrate for holding LEDs o provide light for light pipe bulb assemblies 103 of middle housing face element is mounted along the front face of metal backing element 208. In other versions, the PCBAs may be mounted to the housing face element for which they provide LED light, for example with standoff posts.

The lighting assembly 100 incorporates multiple LED strips for enhanced lighting effects. The front LED strip 210 is secured behind front LED trim piece 212. Similarly, the middle LED strip 214 is secured behind middle LED trim 216. The rear LED strip 218, accompanied by the rear LED trim 220, completes the lighting configuration, ensuring a uniform distribution of light across the assembly. Mohawk light assembly 206 may also include LED strips behind translucent front elements of its three lighting strips.

The entire assembly is supported by the metal backing element 208, which, in this embodiment, is shaped to fit over cabinet 101 of gaming machine 10 and provide capability to retrofit or modify a gaming cabinet to include a marquee style lighting assembly. Generally, the configuration of the lighting assembly 100 allows for an efficient and cost-effective assembly process, when assembling a gaming cabinet or other lighting assembly such as a display sign.

Figures 3, 4:
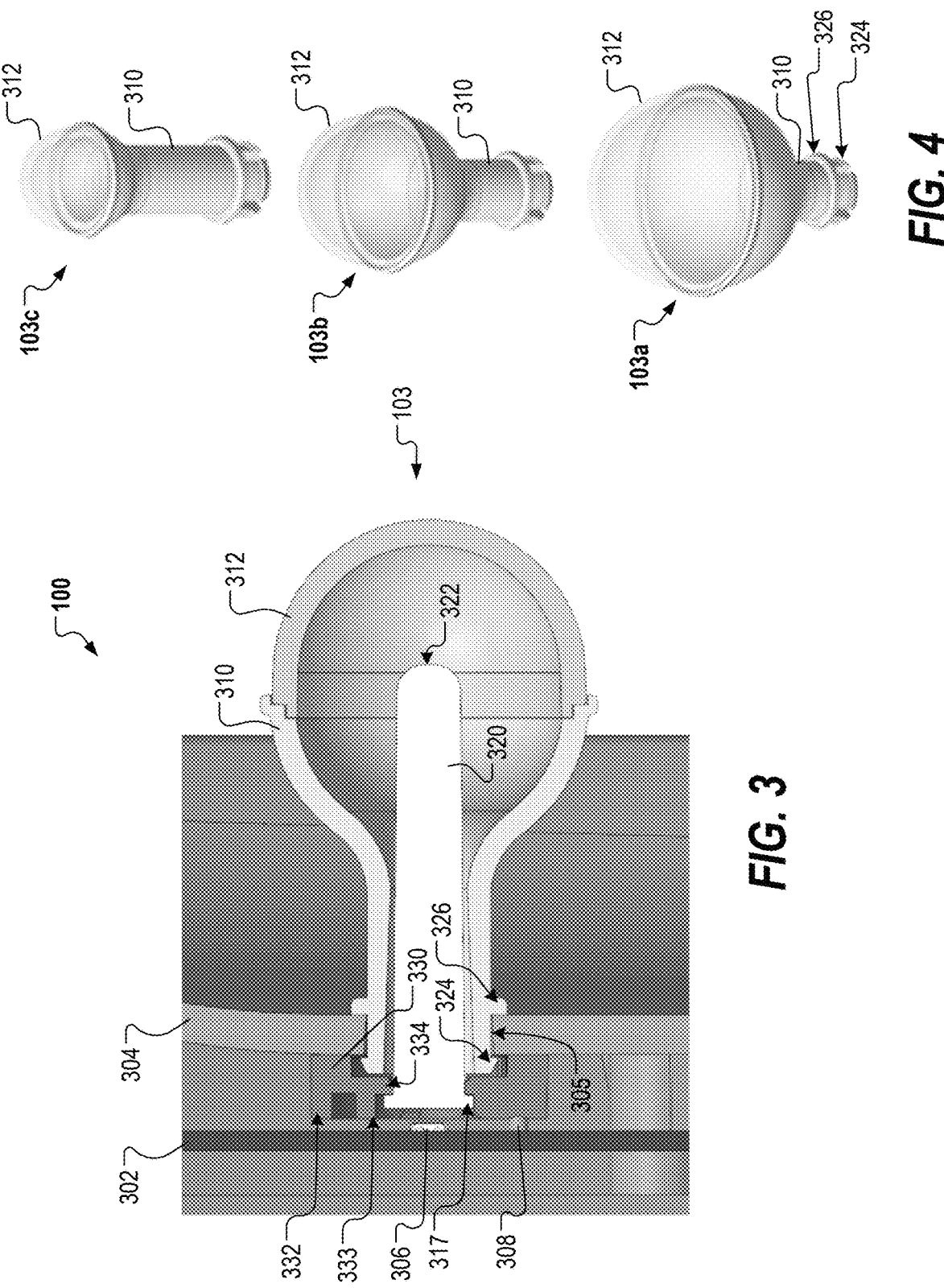
FIG. 3 shows a cross-sectional side view of a portion of a lighting assembly according to some embodiments.
FIG. 4 shows three partial light pipe bulb assemblies 103*a*, 103*b*, and 130*c*, in perspective view.
Figure 5:
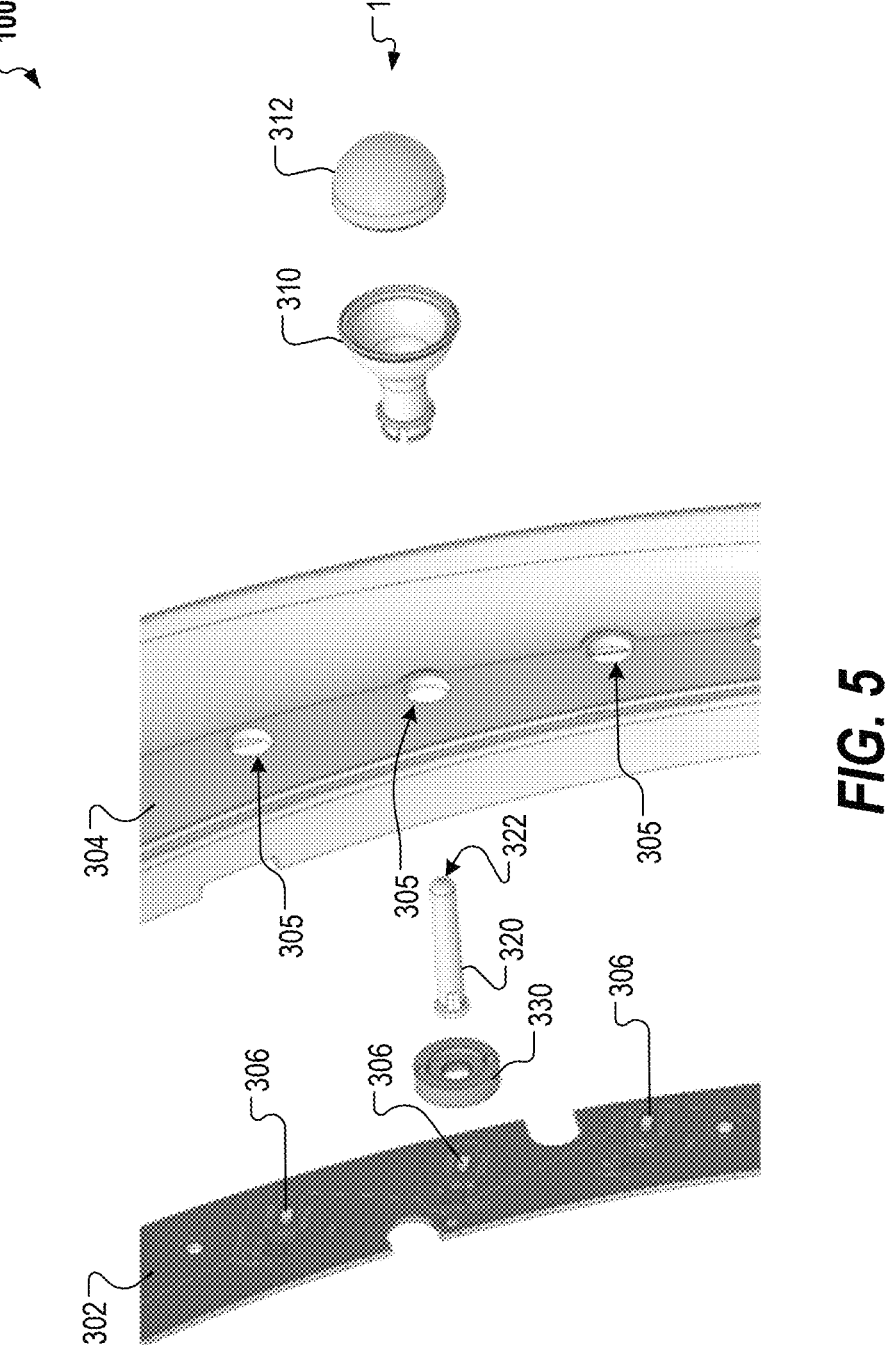
FIG. 5 shows an exploded view perspective of a portion of a lighting assembly illustrating an assembly process for a light pipe bulb assembly.

FIG. 3 shows a cross-sectional side view of a portion of a lighting assembly 100 according to some embodiments. The depicted cross section shows a single light pipe bulb assembly 103 and the surrounding structure of lighting assembly 100. Lighting assembly 100 may be used in a variety of applications, and is particularly suitable for use in gaming machines. FIG. 5 shows an exploded view of a portion of a lighting assembly 100, and illustrating an assembly process for a single one of the light pipe bulb assemblies 103.

Referring to FIG. 3 and FIG. 5, the lighting assembly 100 includes an assembly housing with a housing face element 304 that defines a plurality of holes 305, with one of holes 305 being shown in the FIG. 3. Positioned behind the housing face element 304 is a printed circuit board assembly (PCBA) 302, which includes an LED package 306 mounted thereto. Lighting assembly 100 further includes multiple light pipe bulb assemblies 103 similar to the single one depicted. PCBA 302 may be a flexible or rigid PCBA, and is rigid in this version. While a PCBA is used herein, in other embodiments, any mounting structure that will hold LED packages with one or more LEDs may be used. For example, LED strips may be used.

Each light pipe bulb assembly 103, in this embodiment, includes a bulb housing 310, a transparent dome 312, a light pipe 320, and a light pipe holder 330. Light bulb housing 310, in the installed position depicted in FIG. 3, extends through a respective one of the holes 305 of housing face element 304 and defines an interior volume. Positioned between PCBA 302 and housing face element 304 is a light pipe holder 330, which securely holds light pipe 320, with a proximal end positioned in front of a respective LED package 306 to receive light emitted from the LED package 306. Light pipe 320 extends forward within the interior volume of bulb housing 310, passing through the respective hole 305 of the housing face element 304, and presents a distal end 322 toward the transparent dome 312 for emitting light through the transparent dome 312.

Connected to the front portion of the bulb housing 310 is transparent dome 312, through which light from the light pipe is emitted. While in this embodiment, bulb housing 310 and transparent dome 312 are formed as separate pieces that are attached to each other during assembly, in other embodiments they may be formed of a unitary piece. Light pipe 320 is preferably formed of acrylic or another suitable transparent or translucent plastic. Bulb housing 310 is preferably formed of injection molded plastic, and in this embodiment is formed separately from transparent dome 312 to allow a reflective coating to be applied. Transparent dome 312 is also formed of injection molded plastic. In other embodiments, transparent dome 312 and bulb housing 310 may be formed in a unitary piece using, for example, blow molding. In one embodiment, distal end 322 of light pipe 320 is textured to diffuse the emitted light in a pattern resembling an incandescent light bulb filament. The light pipe 320 may be constructed using injection molding acrylic. In some embodiments, the distal end 322 can be textured with an MT-11010 texture or its generic equivalent to achieve the desired light diffusion. The inventors have found that such a texture causes the emitted light to closely resemble traditional incandescent bulbs in the depicted implementation. Other embodiments may use other textures similar in shape and depth to MT-11010. For example, an MT-11000 or an MT-11020 texture may be used, or their generic equivalent.

Light pipe holder 330 includes an outer portion 332 that abuts the housing face element 304 and an inner portion 333 defining an opening. An inner retention ridge 334 extends into the opening and abuts an outer retention ridge 317 of light pipe 320, ensuring secure positioning of the light pipe 320. A plastic heat stake 308 secures light pipe holder 330 to housing face element 304. Typically heat stake 308 is formed as part of housing face element 304, and during assembly is heated and passed through a hole in light pipe holder 330. The heating bonds the plastic heat stake to light pipe holder 330. The proximal end of heat stake 308, visible in the drawing between light pipe holder 330 and PCBA 302, may also serve as a spacer, ensuring a desired distance between light pipe holder 330 and PCBA 302.

Bulb housing 310 further includes a proximal inner retention ridge 324 abutting a back surface of the housing face element 304 and a distal inner retention ridge 326 abutting a front surface of the housing face element 304. In some embodiments, the proximal inner retention ridge 324 is a snap-fit ridge, allowing for bulb housing 310 and transparent dome 312. Bulb housing 310 includes a tubular portion extending through the respective hole 305, forming proximal inner retention ridge 324 and distal inner retention ridge 326. An outer half-globe portion receives transparent dome 312 for attachment, and a fillet portion of increasing diameter connects the tubular portion and the outer half-globe portion. While in this embodiment, bulb housing 310 is secured to housing face element 304 as shown, in other embodiments it may be secured in other ways. For example, bulb housing 310 may be secured with glue, a heat stake, or a screw. Further, while a separate light pipe holder is employed in this embodiment, other embodiments may include a structure with no light pipe holder, or may integrate the light pipe holder into the light pipe structure.

In applications such as gaming machines, the lighting assembly 100 may be configured with the plurality of holes 305 of the housing face element 304 arranged in a curve (for example, curve 350 of FIG. 2) along a front side of the gaming machine lighting assembly. A second plurality of holes may also be defined by the housing face element 304 and arranged in a second curve (for example, curve 351 of FIG. 2). The gaming machine lighting assembly may include a second PCBA positioned behind the housing face element 304 with a second plurality of LED packages mounted thereto. A second plurality of light pipe bulb assemblies, constructed similarly to the first, may be arranged in the second curve along the second plurality of holes.

In further embodiments, the gaming machine lighting assembly may include a second housing face element (for example, 304b, FIG. 2) positioned above and backwards from the first housing face element, defining a third and fourth plurality of holes arranged in curves (352, 353, FIG. 2). Third and fourth PCBAs may be positioned behind the second housing face element, each including a respective plurality of LED packages. Third and fourth pluralities of light pipe bulb assemblies, constructed as described, may be arranged in corresponding curves along the third and fourth plurality of holes. While multiple PCBA's are used here, in other embodiments a single PCBA may hold packaged LED's for all of light pipe bulb assemblies. For lighting assemblies that include light pipe bulb assemblies at different elevations with respect to the PCBA surface, such as he two tiers herein forming by first and second housing face elements, a single PCBA may hold LED's for all of the light pipe bulb assemblies, and light pipes of different lengths may be used to span the different elevations.

In some embodiments, the invention also encompasses a light pipe bulb assembly as shown. As can be understood, the light pipe bulb assembly 103 provides lower cost and ease of assembly than using LED bulbs or traditional incandescent bulbs. The front faces of the housing face elements do not require light bulb sockets or electrical connections thereto. Instead, the electrical connections for the LEDs are all made within the PCBA.

FIG. 4 shows three partial light pipe bulb assemblies 103*a*, 103*b*, and 130*c*, in perspective view, illustrating three different sizes of light pipe bulb assemblies that are employed in the lighting assembly 100 of FIG. 1. The light pipe 320 and light pipe holder 330 are not shown, as they are the same for all three depicted configurations.

Light pipe bulb assembly 103*a* is made to simulate a large incandescent bulb and in the embodiment of FIG. 1 and FIG. 2 are installed toward the top of the housing face elements in lighting assembly 100 of FIG. 1. Bulb housing 310 in each assembly 103*a*, 103*b*, and 130*c* includes a tubular portion for extending through the respective hole 305 of the same size. As can be seen in the perspective view, a snap fit connection into the housing face element is allowed by multiple slots formed between the proximal inner retention ridge 324 and the distal inner retention ridge 326. The outer half-globe portion is shown in three different sizes for receiving three respectively sized transparent domes 312 for attachment.

Figure 6:
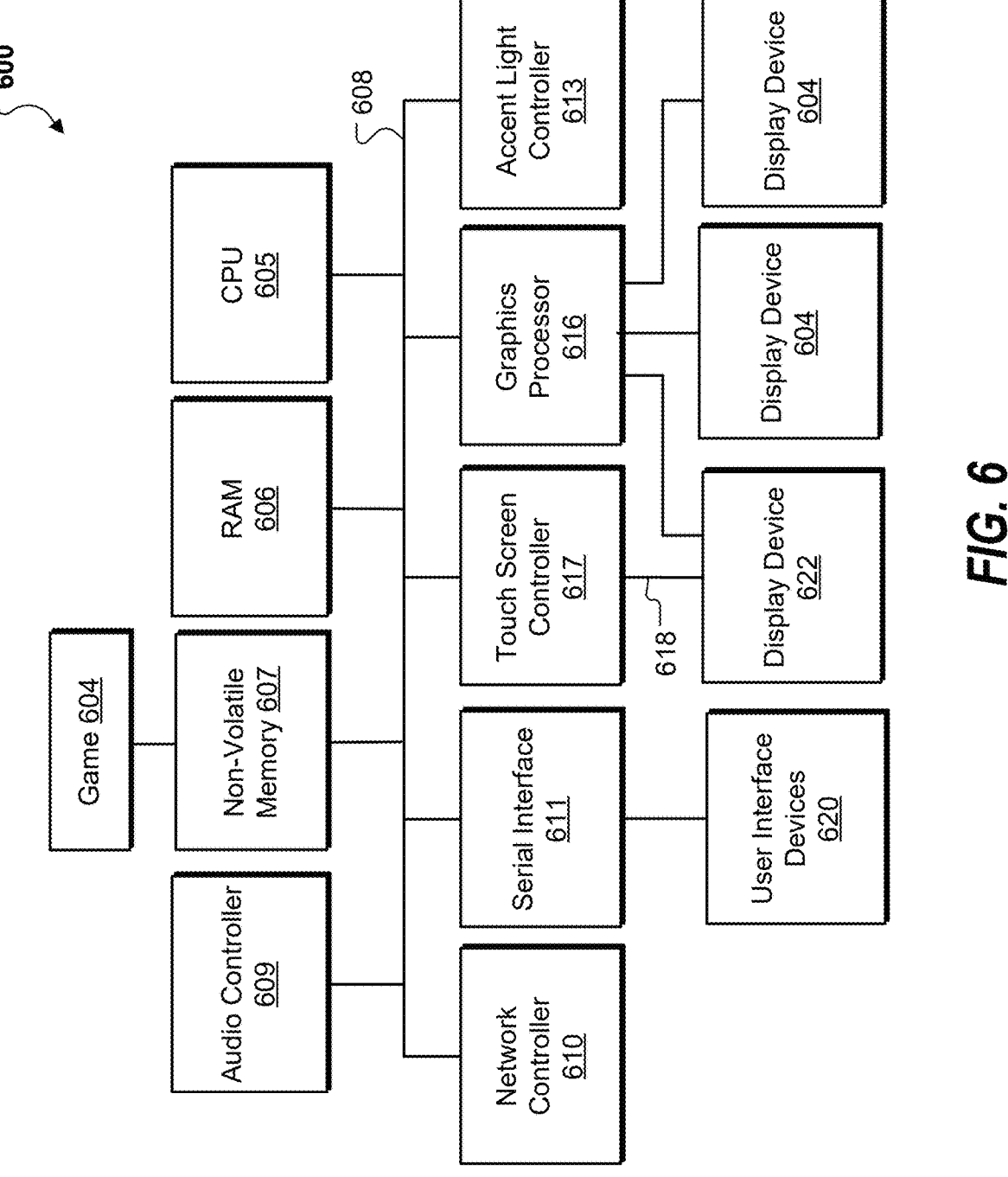
FIG. 6 is a block diagram showing the various components that may be included in a gaming machine in accordance with embodiments of this invention.

FIG. 6 shows a hardware block diagram of a gaming machine constructed with a lighting assembly 100 according to another example embodiment. Gaming machine 600 includes a processor (CPU) 605 along with a suitable connection to random access memory (RAM) 606. CPU 605 and a non-volatile memory device 607 are connected on a system bus 608 with an audio controller device 609, a network controller 610, a serial interface 611, and a graphics processor 615. Graphics processor 615 may provide a suitable video output to video display devices included on the gaming machine such as video display devices and touch screen display device mounted on the button deck of a gaming machine. Multiple graphics processors may be required depending upon the number of display devices included on the gaming machine. As shown in FIG. 6, a gaming machine also includes a touch screen controller 617 connected to system bus 608. Touch screen controller 617 is also connected via signal path 618 to receive signals from a touch screen element (not shown) associated with a video display device 622.

Those familiar with data processing devices and systems will appreciate that other basic electronic components will be included in a gaming machine such as a power supply, cooling systems for the various system components, audio amplifiers, and other devices that are common in gaming machines. These additional devices are omitted from the drawings so as not to obscure the present invention in unnecessary detail.

All of the elements 605, 606, 607, 608, 609, 610, and 611 shown in FIG. 6 are elements commonly associated with a gaming machine. These elements may be mounted on one or more circuit boards housed within a cabinet with or without a separate enclosure. Those familiar with data processing systems and the various data processing elements shown in FIG. 6 will appreciate that many variations on this illustrated structure may be used within the scope of the present invention. For example, since serial communications are commonly employed to communicate with a touch screen controller such as touch screen controller 617, the touch screen controller may not be connected on system bus 608, but instead include a serial communications line to serial interface 611 (a USB controller for example). It will also be appreciated that some of the devices shown in FIG. 6 as being connected directly on system bus 608 may in fact communicate with the other system components through a suitable expansion bus. Audio controller 609, for example, may be connected to the system via a PCI or PCIe bus or bus configured according to some other expansion bus standard.

System bus 608 is shown in FIG. 6 merely to indicate that the various components are connected in some fashion for communication with CPU 605 and is not intended to limit the invention to any particular bus architecture.

Numerous other variations in the gaming machine internal structure and system may be used without departing from the principles of the present invention. For example, a gaming machine in some embodiments of the present invention may rely on one or more data processors located remotely from the gaming machine itself. Embodiments of the present invention may include no processor such as CPU 605 or graphics processor such as 615 at the gaming machine and may instead rely on one or more remote processors. Thus, unless specifically stated otherwise, the designation "gaming machine" is used in this disclosure and the accompanying claims to designate a system of devices that operate together to provide the indicated functions. A "gaming machine" may include a gaming machine that is itself a system of various components and may also include one or more components remote from a gaming machine cabinet. As used herein, the designation "gaming machine" encompasses both a stand-alone gaming machine and a gaming machine along with one or more remote components for providing various functions (such as identifying prizes for a given play and controlling result display graphics and performing other operations).

It will also be appreciated that graphics processors are also commonly a part of modern computer systems. Although separate graphics processor 615 is shown for controlling display devices 604 and 622, CPU 605 or a graphics processor packaged with or included with CPU 605 may control all of the display devices directly without any separately packaged graphics processor. The invention is not limited to any particular arrangement of processing devices for controlling the display devices included with gaming machine. Also, a gaming machine implementing the present invention is not limited to any particular number of video display devices or other types of display devices. While display devices 604 and 622 are shown in the example implementation, the display device area may be arranged differently than the portrait orientation shown or may be an area of a single display device.

Control of display devices 604 and 622 will include a suitable driving signal for driving the respective display. Such a driving signal may include any video signal format or standard that the respective display device is adapted to receive. For example, a DisplayPort, HDMI, or DVI signal may be used to drive a respective one of the displays to provide the desired images. Of course, each display will commonly receive operating power separately from the display driving signal.

In the gaming machine, CPU 605 executes software, that is, program code, that ultimately controls the entire gaming machine including the receipt of player inputs and the presentation of the graphics or information displayed through the display devices 604 and 622 and any other display devices associated with the gaming machine. CPU 605 also executes software related to communications handled through network controller 610, and software related to various peripheral devices such as those connected to the system through audio controller 609, serial interface 611, and touch screen controller 617. CPU 605 may also execute software to perform accounting functions associated with game play. Random access memory 606 provides memory for use by CPU 605 in executing its various software programs while the nonvolatile memory device 607 may comprise mass storage device providing storage for game software (program code) prior to loading into random access memory 606 for execution, or for programs and program assets not in use or for other data generated or used in the course of gaming machine operation. Network controller 610 provides an interface to other components of a gaming system in which gaming machine may be included.

It should be noted that the invention is not limited to gaming machines employing the specially configured general purpose processing devices and personal computer-type arrangement of processing devices and interfaces shown in example gaming machine. Other gaming machines through which the invention may be implemented may include one or more special purpose processing devices to perform the various processing steps for implementing the invention.

Accent light controller 613 is coupled to the lighting assembly 100, and sends control signals to control the intensity, and in some embodiments, the color, of each packaged LED in the lighting assembly 100 as a group, or individually in a time varying lighting presentation, which is coordinated for particular games played on the machine and game events occurring during game play. Accent light controller 613 may also control accent lighting presentations of other LED strip and light panels associated with the gaming machines such as the lighting assembly 100 described in various embodiments above. The lighting assemblies herein may be controlled conveniently through serial communications to an accent light assembly controller. Thus, some embodiments of the present invention that employ an accent light assembly may use a serial interface device such as serial interface 611 to control communications with an accent light assembly and may not include a direct bus interconnection as indicated by FIG. 6.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

In the above descriptions and the following claims, terms such as front, back, upper, lower, right, and left and the like with reference to a given feature are made with reference to the orientation of the display panel, gaming machines, or gaming machine installation shown in the drawings.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each"

is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

The invention claimed is:

1. A lighting assembly comprising:
an assembly housing with a housing face element defining a plurality of holes therein;
a PCB positioned behind the housing face element and including a first plurality of LED packages mounted thereto; and
a first plurality of light pipe bulb assemblies each comprising:
a bulb housing extending through a respective one of the holes of the housing face element and defining an interior volume;
a transparent dome attached to a front portion of the bulb housing;
a light pipe holder positioned between the PCB and the housing face element; and
a light pipe held by the light pipe holder with a proximal end positioned in front of a respective one of the LED packages to receive light from the LED package, the light pipe extending forward within the interior volume of the bulb housing through the respective hole of the housing face element to present a distal end toward the transparent dome for emitting light through the transparent dome.

2. The lighting assembly of claim 1 wherein:
the distal end of the light pipe is textured to diffuse the emitted light.

3. The lighting assembly of claim 2 wherein:
the light pipe is constructed with injection molded acrylic, and the distal end of the light pipe is textured with an MT11010 texture.

4. The lighting assembly of claim 1 wherein:
the light pipe holder includes an outer portion abutting the housing face element and an inner portion defining an opening with an inner retention ridge extending into the opening and abutting an outer retention ridge of the light pipe.

5. The lighting assembly of claim 1 wherein:
the bulb housing further comprises a proximal inner retention ridge abutting a back surface of the housing face element, and a distal inner retention ridge abutting a front surface of the housing face element.

6. The lighting assembly of claim 5 wherein:
the proximal inner retention ridge is a snap-fit ridge.

7. The lighting assembly of claim 5 wherein:
the bulb housing further comprises a tubular portion extending through the respective hole and forming the proximal inner retention ridge and the distal inner retention ridge, an outer half-globe portion for connecting the transparent dome, and a fillet portion of increasing diameter connecting the tubular portion and the outer half-globe portion.

8. The lighting assembly of claim 1 wherein:

the lighting assembly is a gaming machine lighting assembly;

the plurality of holes of the housing face element are arranged in a curve along a front side of the gaming machine lighting assembly;

a second plurality of holes are also defined by the housing face element and arranged in a second curve along a front side of the gaming machine lighting assembly;

the gaming machine lighting assembly also includes a second PCB positioned behind the housing face element and including a second plurality of LED packages mounted thereto; and the gaming machine lighting assembly further comprises a second plurality of light pipe bulb assemblies constructed like the first, and arranged in a second curve along a second plurality of holes of the housing face element.

9. The lighting assembly of claim 8 wherein:

the gaming machine lighting assembly includes a second housing face element positioned above and backwards from the first housing face element and defining a third plurality of holes and a fourth plurality of holes arranged in curves;

the gaming machine lighting assembly also includes a third and fourth PCBs positioned behind the housing face element and including a third and fourth pluralities of LED packages mounted thereto; and the gaming machine lighting assembly further comprises a third plurality of light pipe bulb assemblies and a fourth plurality of light pipe bulb assemblies constructed as in claim 1 and arranged in a third and fourth curves along the third and fourth plurality of holes of the second housing face element.

10. A light pipe bulb assembly for receiving light from an LED on a PCB at a back side of a housing face element and emitting the light at a front side of a housing face element, comprising:

a bulb housing adapted to be mounted through a hole in the housing face element and defining an interior volume;

a transparent dome attached to a front portion of the bulb housing;

a light pipe holder positioned between the PCB and the housing face element; and a light pipe held by the light pipe holder with a proximal end positioned to receive light from the LED, the light pipe extending forward within the interior volume of the bulb housing to present a distal end toward the transparent dome for emitting light.

11. The light pipe bulb assembly of claim 10 wherein:

the distal end of the light pipe is textured to diffuse the emitted light.

12. The light pipe bulb assembly of claim 11 wherein:

the light pipe is constructed with injection molded acrylic, and the distal end of the light pipe is textured with an MT11010 texture.

13. The light pipe bulb assembly of claim 10 wherein:

the light pipe holder includes an outer portion abutting the housing face element and an inner portion defining an opening with an inner retention ridge extending into the opening and abutting an outer retention ridge of the light pipe.

14. The light pipe bulb assembly of claim 10 wherein:

the bulb housing further comprises a proximal inner retention ridge abutting a back surface of the housing face element, and a distal inner retention ridge abutting a front surface of the housing face element.

15. The light pipe bulb assembly of claim 14 wherein:

the proximal inner retention ridge is a snap-fit ridge.

16. The light pipe bulb assembly of claim 14 wherein:

the bulb housing further comprises a tubular portion extending through the respective hole and forming the proximal inner retention ridge and the distal inner retention ridge, an outer half-globe portion for connecting the transparent dome, and a fillet portion of increasing diameter connecting the tubular portion and the outer half-globe portion.

\* \* \* \* \*